United States Patent
Guynn et al.

(10) Patent No.: US 7,485,237 B2
(45) Date of Patent: Feb. 3, 2009

(54) METHOD AND APPARATUS FOR STONE ENGRAVING

(75) Inventors: Aubrey Guynn, Bountiful, UT (US); Catherine Shuman, West Jordan, UT (US)

(73) Assignee: Decoro Art Stone, West Jordan, UT (US)

( * ) Notice: Subject to any disclaimer, the term of this patent is extended or adjusted under 35 U.S.C. 154(b) by 140 days.

(21) Appl. No.: 11/182,587

(22) Filed: Jul. 14, 2005

(65) Prior Publication Data
US 2006/0011576 A1    Jan. 19, 2006

Related U.S. Application Data

(60) Provisional application No. 60/587,835, filed on Jul. 14, 2004.

(51) Int. Cl.
*B44C 1/22* (2006.01)
(52) U.S. Cl. .................... 216/30; 219/121.69
(58) Field of Classification Search .............. 216/28, 216/30, 87, 94, 41–49; 219/121.68, 121.69
See application file for complete search history.

(56) References Cited

U.S. PATENT DOCUMENTS 5,178,725 A * 1/1993 Takeno et al. ............ 216/87
5,393,377 A * 2/1995 Pasaran Sayago et al. ..... 216/30

FOREIGN PATENT DOCUMENTS

| DE | 118673 A * 3/1976 |
| EP | 178654 A2 * 4/1986 |
| EP | 627392 A1 * 12/1994 |
| JP | 06000812 A * 1/1994 |

* cited by examiner

*Primary Examiner*—Roberts Culbert
(74) *Attorney, Agent, or Firm*—Workman Nydegger

(57) ABSTRACT

A method and apparatus for engraving or etching the surface of a solid surface material such as stone, tile, or the like, utilizing a combination of a laser and a corrosive agent. A mask material configured to be applied to the top surface of the solid surface material. A laser is utilized remove mask material to form desired designs in the mask material. A corrosive agent is applied to the portions of the solid surface material exposed by the design of the mask to engrave the surface of the solid surface material.

17 Claims, 5 Drawing Sheets

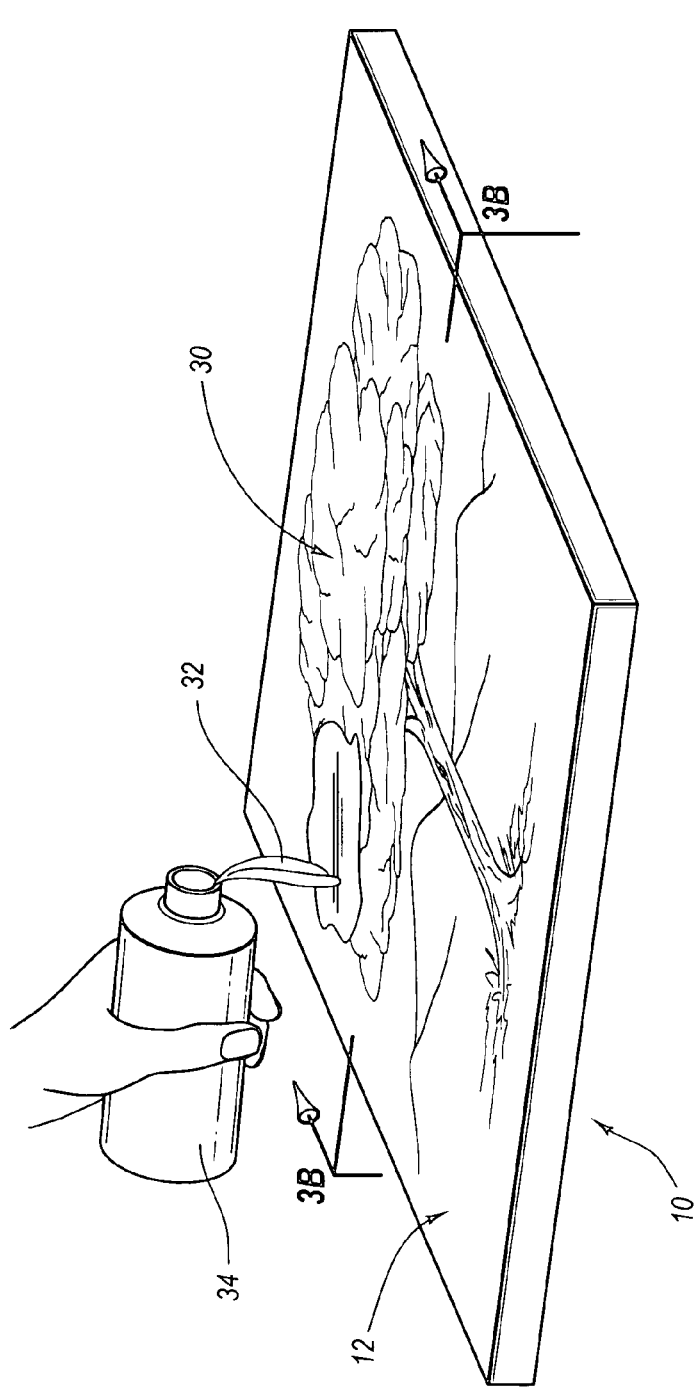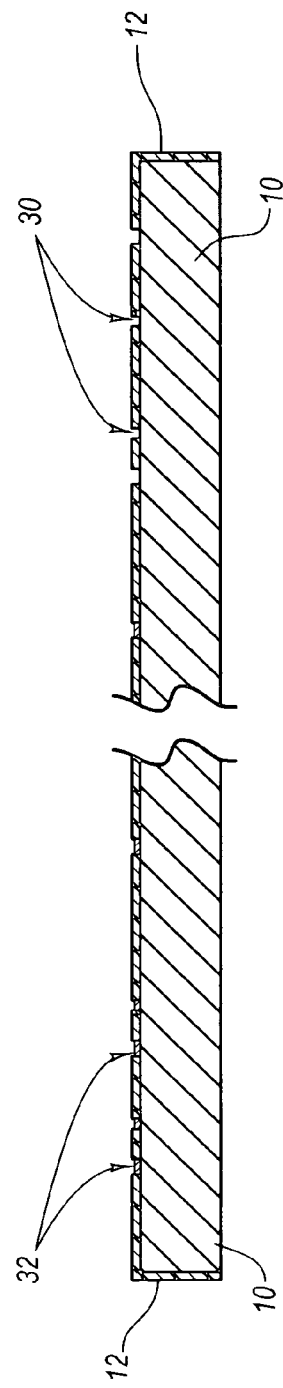

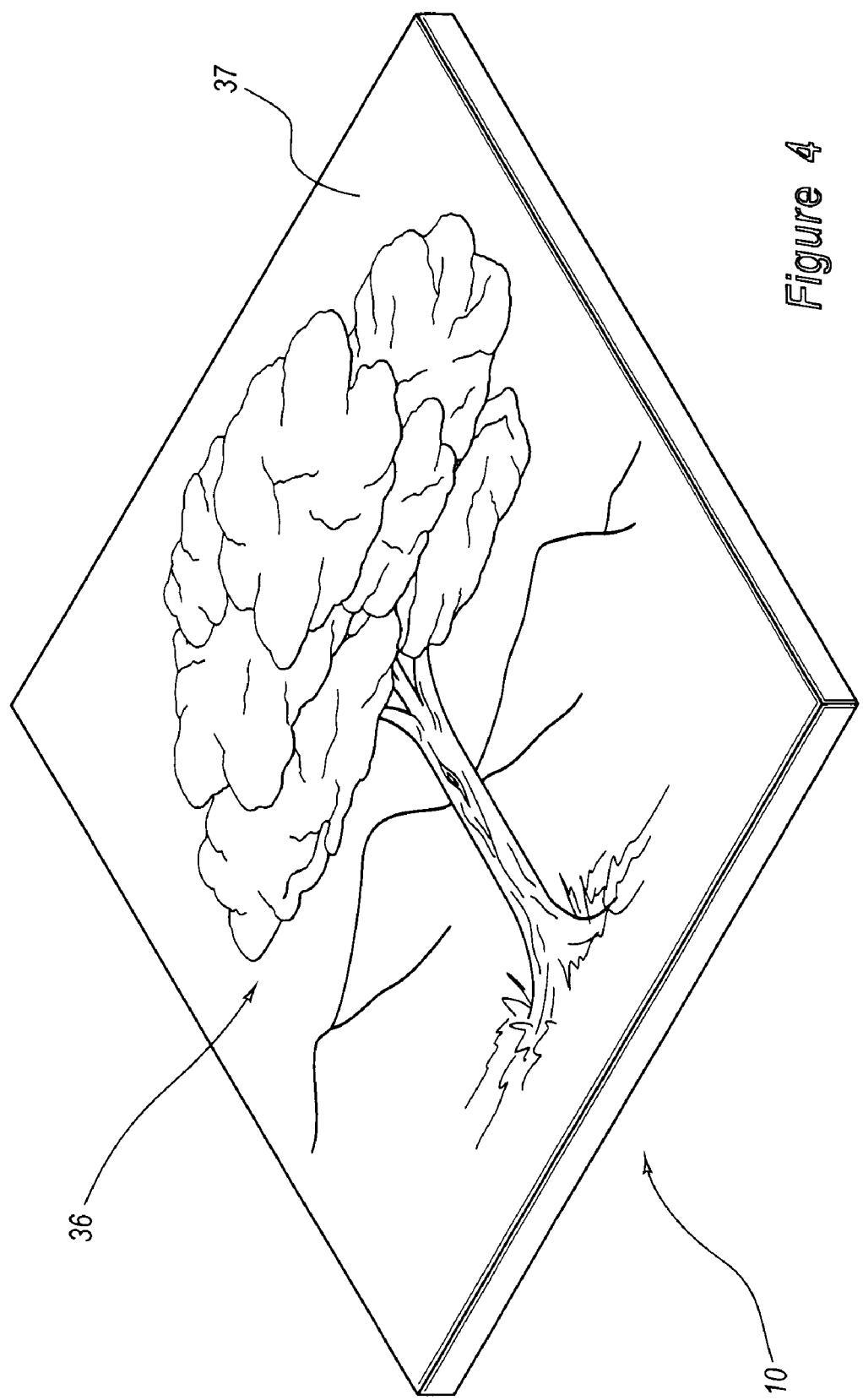

METHOD AND APPARATUS FOR STONE ENGRAVING

CROSS-REFERENCE TO RELATED APPLICATIONS

This application claims the benefit of U.S. Provisional Application Ser. No. 60/587,835, filed Jul. 14, 2004, and entitled "Method or process for engraving or etching decorative materials, stones, signs or solid materials."

BACKGROUND OF THE INVENTION

1. The Field of the Invention

The present invention relates to stone etching. In more particular, the present invention relates to methods and apparatus for etching designs into the surface of stone or other solid surface materials using a combination of a laser and a corrosive agent application.

2. Background and Relevant Art

For centuries people have utilized stone as a medium of expression. Stone is particularly desirable due to the ability of stone to withstand the effects of time and the elements to memorialize words and depictions engraved in the stone. Anciently, skilled artisans used tools such as chisels and scribes to etch or otherwise engrave words and such depictions and designs into the surface of the stone. The greater the depth of such etchings and engravings the longer amount of time such engravings can be maintained on the surface of the stone. While etching and engraving stone has provided an effective mechanism for memorializing such renditions, such etchings and engravings requires an extensive amount of time and effort, making stone engraving quite expensive. As a result, stone engraving has been reserved for very specific applications where the desire to memorialize such engravings justifies the cost associated with creating such engravings. For example, stone engravings are most frequently utilized in graveyard headstones, public memorials, and the like.

In addition to conventional mechanical engraving of stone, chemical applications have also been developed to allow for less time consuming and more cost effective engraving in stone. One traditional mechanism involves the application of a mask material to the surface of the stone. The mask material can be applied in a sheet such as latex which is adhered to the surface of the stone or as a removable layer, such as a wax or rubber layer. Once the mask is applied to the surface of the stone, portions of the mask are removed to form letters, depictions, or other designs. The removal of selective portions of the mask exposes the corresponding portions of the surface of the stone. The portions of the stone which correspond to the unremoved portions of the mask are protected by contact with the mask.

Once the design has been created in the mask, a corrosive agent is then applied to the mask and stone slab. The corrosive agent cuts into those portions of the stone that have been exposed by removal of the mask. The portions of the stone which remain in contact with the mask are protected from exposure to the corrosive agent by the mask itself. Once the corrosive agent has achieved the desired depth in the exposed portions of the stone, the corrosive agent is removed or neutralized and the mask is removed. Once the mask is removed, the exposed engravings and depictions that were originally inscribed in the mask layer have been memorialized in the stone. While the use of a corrosive agent in combination with a mask is less time consuming than traditional mechanical engraving, a fair amount of time and energy must be utilized to remove the mask portions required to form the design. Again, this can substantially limit the type and number of applications in which stone engraving can be utilized. Additionally, the amount of detail and intricacy of such engravings are limited due to time and technical constraints involved in using the mask and corrosive agent combination.

Laser etching or laser engraving into stone and other hard surface materials has allowed for both less labor intensive engraving processes while also allowing a greater degree of detail and intricacy than can be utilized in other stone engraving processes. Laser etching typically involves exposing the material to the focal point of a laser beam causing the energy from the beam to remove or otherwise affect the material exposed. Modern laser systems allow images to be electronically stored and then automatically engraved through automated processes. While laser etching allows for the use of such automated processes and designs having a greater degree of detail, the depth of laser engravings are typically limited to a vary slight etch in the surface of the material. Typically, the depth of such etching is barely detectable to tactile perception.

As a result, while images and other engravings can quickly be formed into stone and other hard surface materials, exposure to outdoor elements quickly deteriorates the quality of such images, minimizing their potential applicability in traditional stone engraving applications. Applying higher amounts of energy during laser etching can result in deeper etching. However, higher amounts of energy typically cause the particles of the material to pop or burst resulting in an uneven and unpredictable appearance. As a result, laser etching is typically utilized where only slight surface etching is required.

Because of the very slight depth provided by laser etching, such laser etchings are only clearly perceptible in dark colored materials having fairly uniform color and surface texture. In an attempt to expand the number and types of materials for which laser etching can be utilized, special coatings have been developed which change color when applied to the laser energy. These coatings have had limited success in providing greater clarity to images in some solid surface materials, but can often produce undesirable and unnatural effects when used with stone, tile, or other hard surface materials. Additionally, the limitations with regard to the depth of such etching are still readily apparent.

BRIEF SUMMARY OF THE INVENTION

The present invention is directed to methods and apparatus for engraving or etching the surface of a solid surface material such as stone, tile, or the like, utilizing a combination of a laser and a corrosive agent. According to one embodiment of the present invention, a liquid mask material is applied to the top surface of the solid surface material and allowed to cure to achieve the desired material properties of the mask. Once the mask has cured, a laser is utilized to cut designs, while also removing mask material. As a result, not only can more intricate depictions and designs be formed in the mask material, but traditional, hand-removal of mask material, which is both time consuming and inefficient, can be eliminated.

Once the laser etching of the mask material has been completed, a corrosive agent, or other chemical mechanism, is applied to the exposed stone to provide the desired depth of stone etching. Not only can significant depths of stone etching be achieved, but a variable depth of the stone etching can be utilized to create shallower and deeper etching fields as desired. Once the desired level of chemical etching has been achieved, the corrosive agent is neutralized and/or removed. The mask can then be removed to reveal the etched stone or other solid surface etched design. This provides both an efficient etched process and a resulting natural end product.

In one embodiment, a laser is utilized to cut and remove mask material from a film or solid surface mask which can later be applied to a stone or other solid surface material for use in chemical etching. In another embodiment, a liquid, wax, or similar mask material can be brushed or sprayed onto the surface of the stone, tile, or other solid surface material in preparation for the laser etching. In another embodiment, the laser etching not only removes the mask portion, but also provides an initial etch into the surface of the stone, tile, or other solid surface material to facilitate chemical reaction between the corrosive agent and the solid surface material.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A and 3B illustrate a corrosive agent being applied to the mask and exposed portions of the stone slab to provide chemical etching of the stone slab.

FIG. 4 illustrates the resultant etching or stone engraving in the surface of the stone slab subsequent to removal of the corrosive agent and mask.

DETAILED DESCRIPTION OF THE PREFERRED EMBODIMENTS

Figure 1:
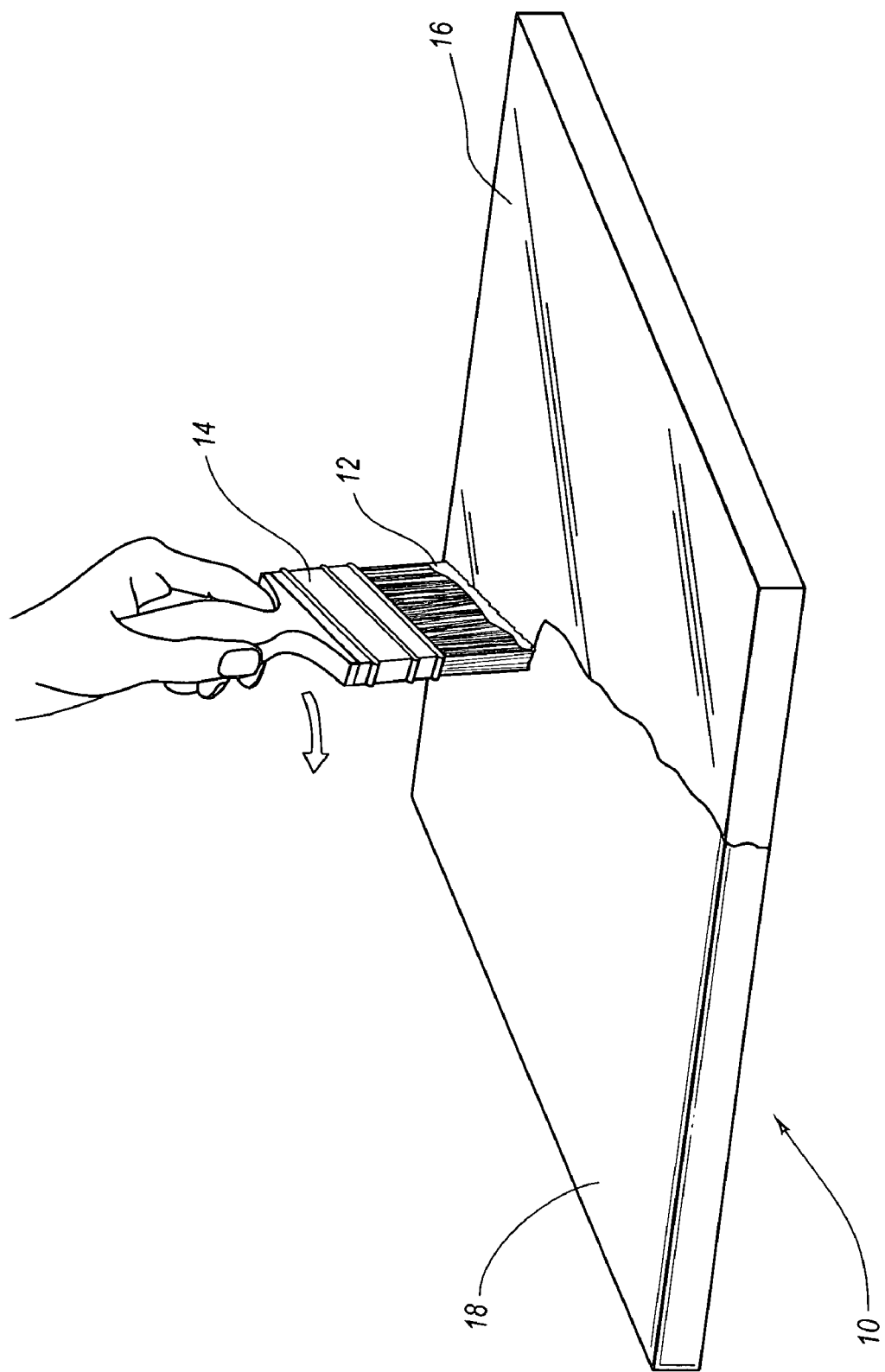
FIG. 1 is a perspective view of a stone slab illustrating a liquid mask being applied to the surface of the stone slab.

FIG. 1 illustrates a stone slab 10 being prepared for etching utilizing methods and apparatus of the present invention. In the illustrated embodiment, a mask 12 is being applied in liquid form to the top and side surfaces of the stone slab 10. Mask 12 is configured to protect the stone slab from intrusion of the corrosive agent into the stone slab. Mask 12 is carefully applied to all portions of stone slab 10 which are desired not to be affected by the corrosive agent. In the illustrated embodiment, mask 12 is being applied by a brush 14. A portion of the upper and side surfaces of stone slab 10 have been coated with mask 12 such that the stone slab 10 has a masked portion 16 and an unmasked portion 18. Typically, the entire top surface of stone slab 10 is covered with mask 12 to create a uniform and desired design. However, it can also be desired to leave a portion of the top surface of stone slab 10 exposed for desired etching effects.

As will be appreciated by those skilled in the art, a variety of types and configurations of masks can be utilized without departing from the scope and spirit of the present invention. For example, in one embodiment a liquid mask is applied to the surface of the stone material which is allowed to cure to achieve desired material properties. Such material properties can include a hard surface, gel-like formulation, or other solid or semisolid material properties. In another embodiment, wax, or other non-liquid but semisolid, coating can be applied in layers or in a single application. In another embodiment, a film or solid surface layer can be directly applied to the solid surface material by utilizing an adhesive. In another embodiment, a film or solid surface mask is chemically pretreated so that it can self-adhere to the solid surface material for which it is being utilized. In another embodiment, a mask material is utilized which can be utilized with a laser and a corrosive agent to provide a desired design detail on the solid surface material.

As will be appreciated by those skilled in the art, stone slab 10 is shown for illustrative purposes only and a variety of types and configurations of solid surface materials can be utilized in accordance with the methods and apparatus of the present invention. For example, in one embodiment, stone tiles, stone slab, or other natural stone materials, such as limestone, travertine, sandstone, or other types of natural or synthetic stone can be utilized. In another embodiment, ceramic tile, porcelain tile, or other tile material is engraved utilizing the method and apparatus of the present invention. In another embodiment, glass, wood, plastics, or other natural or synthetic materials can be engraved according to the methods and processes of the present invention.

Figure 2:
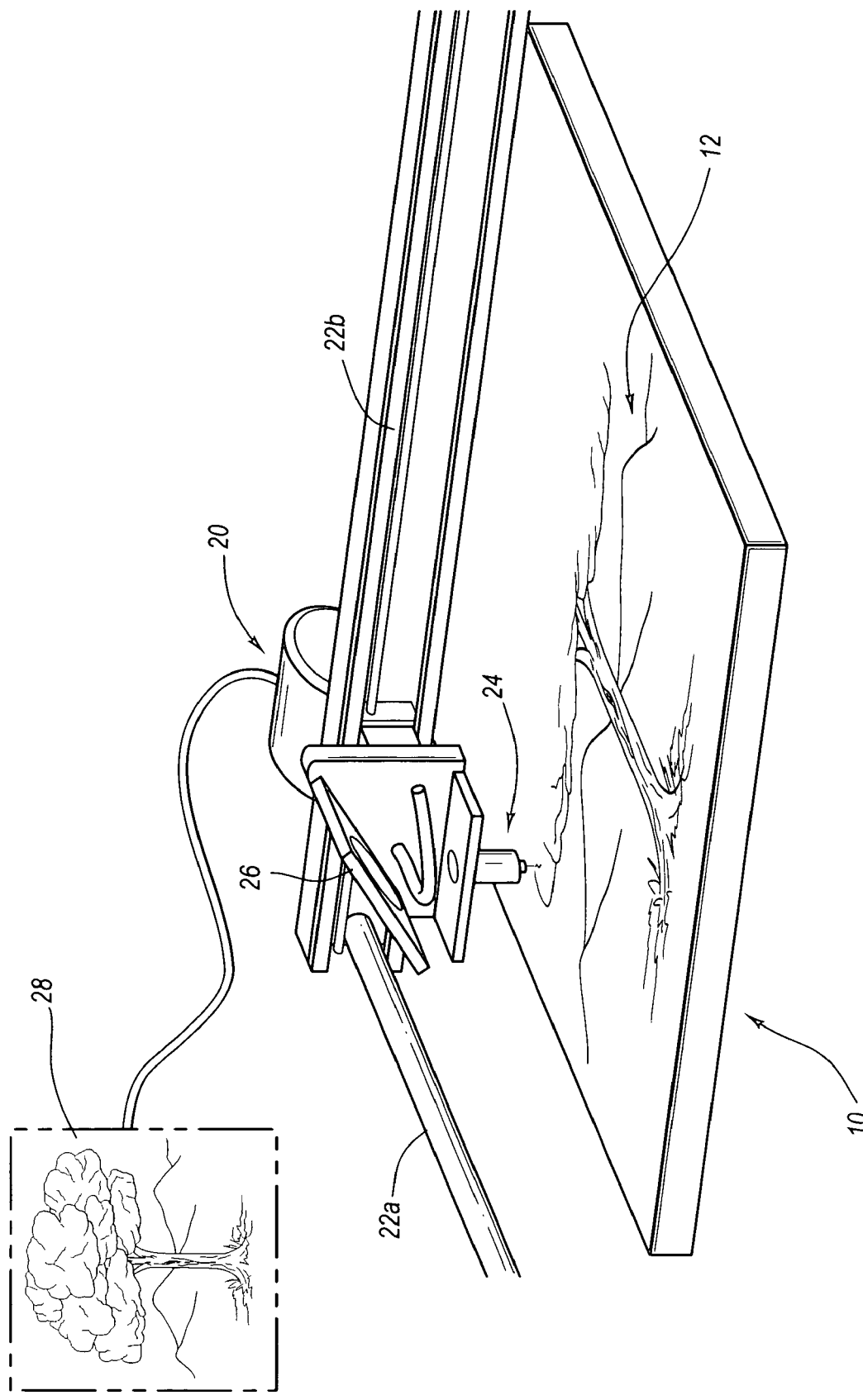
FIG. 2 depicts a laser etching a design into the mask utilizing automated processes.

FIG. 2 is perspective view of stone slab 10 subsequent to application of mask 12 illustrating operation of laser implement 20. In the illustrated embodiment, a laser implement 20 has been positioned adjacent stone slab 12. As previously mentioned, mask 12 has been positioned on stone slab 10 so as to cover the entire upper surface of stone slab 10. Mask 12 is configured to protect stone slab 10 from intrusion of corrosive agents that may be placed on mask 12. In the illustrated embodiment, mask 12 comprises an acrylic or liquid polyester type material which has been allowed to harden to properly bond with stone slab 10 preventing flow of mask 12 subsequent to cutting with laser implement 20.

In the illustrated embodiment, laser implement 20 is utilized to etch mask 12 by removing material from mask 12 to create a desired design in mask 12. As laser implement 20 removes the material from mask 12 to create the design in mask 12 the corresponding portions of stone slab 10 that are positioned beneath the portions of mask 12 that have been removed are exposed to the external environment. The nature of mask 12 and the manner in which mask 12 is bonded to the upper surface of stone slab 10 assures that portions of the upper surface of stone slab 10, which are not exposed subsequent to removal of portions of mask 12, are protected from inadvertent contact with corrosive agents that may be applied to mask 12 and/or stone slab 10.

In the illustrated embodiment, laser implement 20 comprises vector guides 22a, b, a cutting laser 24, and a logic module 26. Vector guides 22a, b allow for plotting of cutting laser 24 to control movement of cutting laser 24. This allows for automated movement of cutting laser 24 to remove the portions of mask 12 that are required to form the desired design in mask portion 16. In the illustrated embodiment, a logic module 26 is provided in connection with cutting laser 24 and vector guides 22a, b to control movement of cutting laser 24 to the desired position over the upper surface of mask 12.

Logic module 26 is operably connected to an electronic representation of a graphic 28. The electronic representation of graphic 28 provides the design, lettering, or other graphic model to be etched into mask 12. Utilizing this graphic representation, laser implement 20 can guide cutting laser 24 to the correct position over mask 12 to remove the desired portions of mask 12 and expose the corresponding portions of stone slab 10 positioned therebeneath. In the illustrated embodiment, the cutting and removal of portions of mask 12 has been partially performed such that the lower portion of the design has been created, but the upper portion of the design has not yet been etched into mask 12.

As will be appreciated by those skilled in the art, a variety of types and configurations of laser implements can be utilized without departing from the scope and spirit of the present invention. For example, in one embodiment, the laser implement comprises an entire housing within which the stone slab is positioned for cutting. In another embodiment, the logic module does not contain a graphic representation of the design, but rather is configured to control movement of the cutting laser as directed from an external processing unit. In another embodiment, the logic module is configured to both store the graphic representation, while also controlling movement of the cutting laser. In another embodiment, the cutting laser comprises a handheld unit that is utilized by a skilled practitioner to cut through the mask. In yet another embodiment, the cutting laser is configured to both remove material from the mask while also creating an initial etching into the stone slab. In another embodiment, the laser implement is provided as part of a manufacturing process in which multiple stone slabs or other solid surface materials, such as ceramic tile, are iteratively positioned and etched as part of an automated process.

FIG. 3A is a perspective view of stone slab 10 subsequent to engraving of mask 12 with a laser etched design 30. In the illustrated embodiment, laser etched design 30 has been engraved in the upper surface of mask 12 exposing the corresponding portions of the upper surface of stone slab 10. As previously discussed, the material properties of mask 12 and its bonding with the upper surface of stone slab 10 ensure that only the portions of stone slab 10 which correspond with the removed portion of mask 12 are exposed to the external environment.

In the illustrated embodiment, a corrosive agent 32 is being sprayed onto mask 12 and the exposed portions of stone slab 10 utilizing an applicator 34. The corrosive agent 32 is adapted to interact with the exposed portions of stone slab 10 to cut into stone slab 10 to create an engraving or etching into the surface of stone slab 10. This allows a deeper engraving or cutting into the exposed portions of the surface of stone slab 10 while preventing any etching occurring to portions of stone slab 10 protected and bonded with mask 12.

FIG. 3B illustrates the mask 12 positioned over stone slab 10. On the right hand side of the FIG. 3B, portions of the laser etched design 30 are depicted as cutting through the entire thickness of mask 12 exposing the surface of stone slab 10 positioned therebeneath. On the left hand side of the figure, a corrosive agent 32 is shown being applied to the mask 12 and exposed portions of stone slab 10. For the sake of clarity, the corrosive agent is depicted as partially filling the portions of the laser etched design 30 cut through the thickness of mask 12. The corrosive agent 32 is shown cutting into the surface of the exposed portions of stone slab 10 at a desired depth. In contrast, the masked portions remain bonded to the upper surface of stone slab 10. The masked portion of the stone slab 10 are non-reactive relative to the corrosive agent 32 preventing etching or other removal of material from the portions of stone slab 10 bonded with the remaining portions of mask 12.

By utilizing laser removal of mask 12 and subsequent application of the corrosive agent to the exposed surface of the stone slab, a detailed and intricate design can be formed in the surface of the stone slab in a quick and efficient manner. In other words, exposure of portions of the stone slab resulting from removal of the portions of the mask material during etching of the mask allows removal of the desired amount of the surface of the stone slab by the corrosive agent. This also permits the engraving of the etched design in the surface of the stone slab.

Once the corrosive agent has cut into stone slab 10 at a desired depth, the corrosive agent can be removed and/or neutralized to prevent further etching into stone slab 10. This allows for controlled etching at a desired depth in the surface of stone slab 10. According to one embodiment of the present invention, subsequent to an initial application of the corrosive agent, portions of the design can then be masked while other portions remain exposed to the external environment. Subsequently, an additional corrosive agent can be applied to the remaining exposed portions of the stone slab to provide additional etching into the surface of the stone slab. In this manner, varying amounts of etching and varying depths of etching can be created in the surface of stone slab to provide a desired and variable effect. As will be appreciated by those skilled in the art, a variety of types and configurations of corrosive agents, which alone, or in combination, can provide for removal of stone from the surface of the stone slab, can be provided and utilized without departing from the scope and spirit of the present invention.

FIG. 4 is a perspective view of stone slab 10 subsequent to removal of mask 12. In the illustrated embodiment, subsequent to removal of mask 12, the etched design 36 formed directly in the upper surface of stone slab 10 is all that remains. The acid etched design 36 in the upper surface of stone slab 10 creates a clearly defined boundary between the polished surface 37 of the upper surface of stone slab 10 and those portions of the upper surface of stone slab 10 which form the acid etched design 36. As will be appreciated by those skilled in the art, a variety of types and configurations of methods and mechanisms can be utilized for removal of the mask. In one embodiment, a chemical treatment is utilized to remove the mask. In another embodiment, a mechanical removal process such as scraping of the mask is utilized. In yet another embodiment, a heat treatment is utilized. In yet another embodiment, a combination of one or more steps is utilized to remove the mask.

Utilization of the laser removal of the mask and subsequent application of the corrosive agent facilitates not only the quick and efficient creation of the acid etched design, but also a level of detail and intricacy that is difficult, if not impossible to achieve with known processes. In particular, the level and depth of stone removal in combination with the design detail that is apparent in the illustrated embodiment is difficult to achieve. For example, in one embodiment, the methods and apparatus of the present invention remove $\frac{1}{16}^{th}$ of an inch of material during engraving of the stone. In another embodiment, less than $\frac{1}{16}^{th}$ of an inch of material is removed during engraving of the stone. In yet another embodiment, more than $\frac{1}{16}^{th}$ of an inch of material is removed during engraving of the stone. Additionally, utilization of laser cutting subsequent to application of mask 12 (as shown in FIG. 2) allows for an accurate and unmodified translation of the desired design onto the stone slab 10.

The ability to etch such intricate and detailed designs to the degree of depth and detail as realizable with the methods and apparatus of the present invention allow for the use of a greater number of different types of materials than can effectively be utilized with known laser systems. For example, materials having greater surface variability, color variability, color tones, and hues can be utilized while still providing clear visibility of the design details of the engraving. Additionally, a wide variety of different types of natural and manufactured tiles can be engraved having similar degrees of variability in color and surface texture than previously possible. An additional benefit of the methods and apparatus of the present invention is that such engraving processes can be automated in an iterative process in which multiple engravings are created without requiring manual labor to achieve the desired results.

Figure 5:
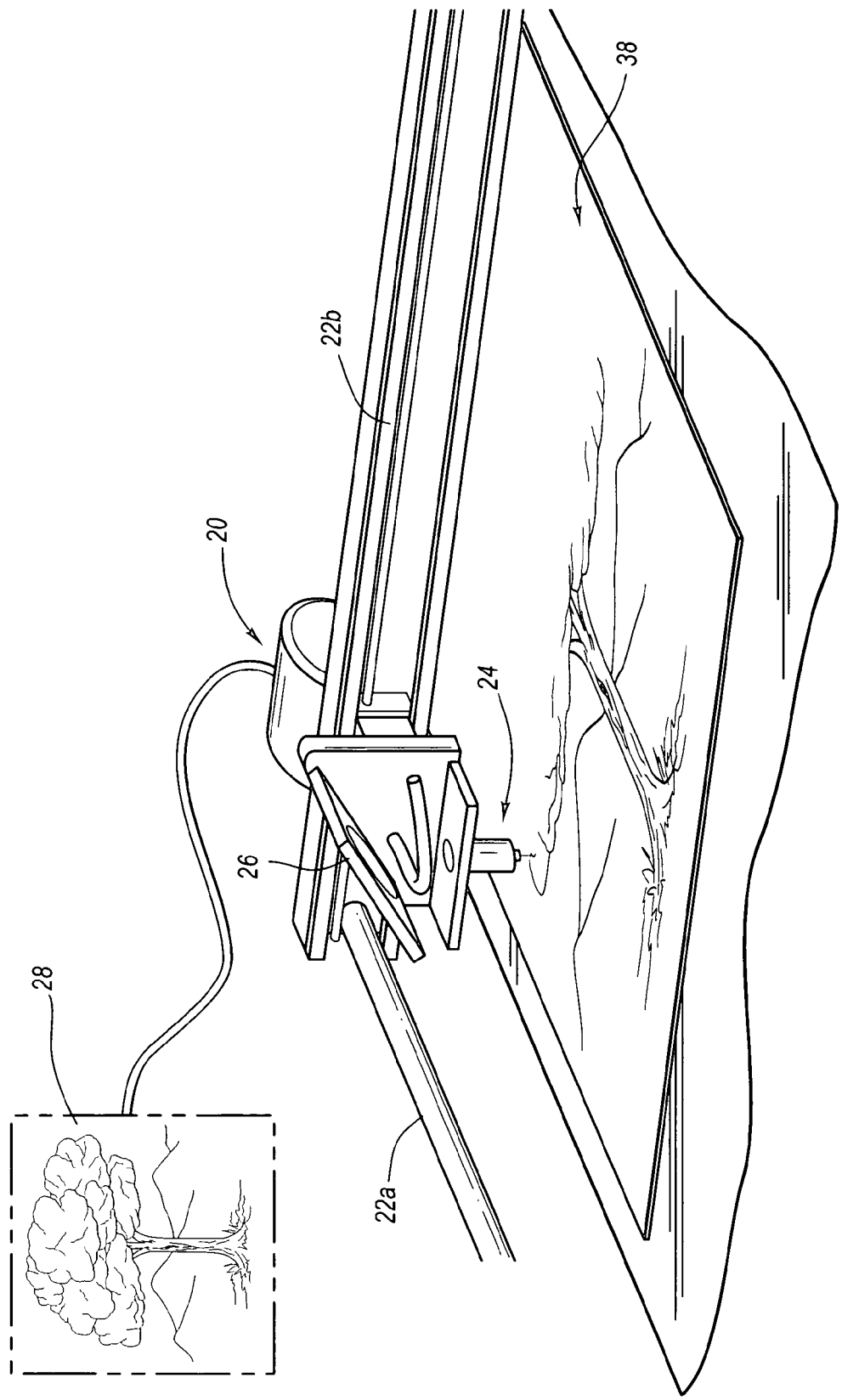
FIG. 5 illustrates an alternative embodiment in which a laser is utilized to cut and remove material from a film or solid surface mask utilizing automated processes before application of the mask to the stone or other solid surface material.

FIG. 5 is a perspective view of a method and apparatus for cutting and removal of portions of a solid surface mask 38 to create a desired design. According to the current embodiment, the solid surface mask 38 is for use in a subsequent step in which a corrosive agent is applied to the solid surface mask 38 and exposed portions of a solid surface material, such as stone or tile. In the illustrated embodiment, the focal point of the cutting laser 24 is guided to cut and remove portions of solid surface mask 38 to form a desired design. This allows for automation of creation of the mask portion before bonding or other application to the solid surface material.

In the illustrated embodiment, a portion of the design has been created while the rest of the design has yet to be etched into the mask material 12. In the illustrated embodiment, subsequent to cutting and removal of the portions of the mask 12 necessary to create the desired design in the mask 12, the mask is applied to solid a surface material such as stone or tile to allow for application of a corrosive agent to provide the desired degree of etching, similar to that depicted with respect to FIG. 4.

As will be appreciated by those skilled in the art, a variety of types and configurations of methods and apparatus can be utilized to provide cutting and removal of a mask utilizing a laser in preparation for application of corrosive agent without departing from the scope and spirit of the present invention. For example, in one embodiment, a mechanical cutting tool is provided. In another embodiment, a hot iron, or other temperature controlled cutting tool, is provided. In another embodiment, a stamp is provided. In another embodiment, a chemical or high speed fluid-type cutting arrangement is provided to cut the mask in preparation for application of a corrosive agent.

By providing automated cutting and removal of the masked portion to create the desired design in preparation for application of a corrosive agent, more delicate and detailed images can be provided which also have a greater engraving depth in the solid surface material than were previously utilized. Additionally, such desired depths can be accomplished with a high degree of precision, while also requiring less labor intensive processes. Such cutting through the mask material can also create an initial etching of the stone material to provide a raw, open surface which can accept and more readily interact with a corrosive agent. The methods and apparatus of the present invention can also allow for also greater visibility of the resulting etching without the use of additional chemical treatments or reactive layers that may create undesirable effects in the solid surface material and may not have the durability and lasting impression created by stone etching alone. Alternatively, additional articles and materials can be utilized in combination with the methods and apparatus of the present invention to create desired ornamental effects for a particular application or client.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of etching stone comprising:
   applying a mask material to a surface of a stone slab;
   etching the mask using a laser to remove portions of the mask material and expose selected portions of the surface of the stone slab to form a design in the mask, wherein the laser etches the surface of the stone slab during etching of the mask; and
   applying a chemical corrosive agent to at least the portions of the surface of the stone slab exposed by the design in the mask to engrave the surface of the stone slab to form a corresponding design in the surface of the stone slab.

2. The method of claim 1, wherein the mask material comprises a liquid.

3. The method of claim 2, wherein the mask material forms a solid subsequent to application to the surface of the stone slab.

4. The method of claim 2, wherein the mask material forms a semi-solid subsequent to application to the surface of the stone slab.

5. The method of claim 1, wherein the laser etches the surface of the stone slab.

6. The method of claim 5, wherein the laser etches the surface of the stone slab subsequent to etching of the mask.

7. The method of claim 6, wherein the corrosive agent can remove a given amount of stone material subsequent to etching of the surface of the stone slab by the laser.

8. The method of claim 6, further comprising removing the corrosive agent when a desired depth of engraving has been achieved.

9. The method of claim 6, further comprising neutralizing the coffosive agent when a desired depth of engraving has been achieved.

10. The method of claim 1, wherein the stone slab comprises a tile.

11. The method of claim 1, wherein stone slab comprises a natural stone material.

12. A method of forming an ornamental engraving in a surface of a stone slab comprising:
    providing a mask material over a surface of a stone slab;
    removing selective portions of the mask material using a laser to expose portions of the surface of the stone slab, wherein the laser etches at least a portion of the surface of the stone slab during removal of the mask material, wherein the exposed portions of the surface of the stone slab form a design; and
    etching the exposed portions of the surface of the stone slab with a chemical corrosive agent to form a corresponding design in the surface of the stone slab.

13. The method of claim 12, wherein providing a stone slab comprises providing a stone slab formed from natural stone.

14. The method of claim 12, wherein the stone slab comprises a graveyard headstone.

15. The method of claim 12, wherein etching the exposed portions of the surface of the stone slab comprises etching the ornamental design into the stone slab to a depth of at least about 15.9 mm (about 1/16 in.) from the surface.

16. The method of claim 12, wherein the stone slab comprises a graveyard headstone.

17. The method of claim 1, wherein the stone slab comprises a graveyard headstone.

* * * * *